United States Patent
Nowack

[15] 3,692,853
[45] Sept. 19, 1972

[54] ZINC ARSENIDE ISOMERIZATION CATALYST AND PROCESS

[72] Inventor: Gerhard P. Nowack, Bartlesville, Okla.

[73] Assignee: Phillips Petroleum Company

[22] Filed: Dec. 28, 1970

[21] Appl. No.: 102,106

[52] U.S. Cl............260/666 A, 260/683.2, 252/475
[51] Int. Cl. .................................................G07c 5/22
[58] Field of Search.........260/666 A, 683.2; 252/475

[56] References Cited

UNITED STATES PATENTS 3,375,287   3/1968   Tinsky et al. ..........260/666 A
3,575,848   4/1971   Miale......................260/683.2

OTHER PUBLICATIONS

Chem. Abstracts, Vol. 65, 1966, 1497c, Ya. A. Uzai et al., Ist, Akad. Nauk SSSC, Neorgan, Materialy 2(1) (4–16 Russ)

Primary Examiner—Delbert E. Gantz
Assistant Examiner—Veronica O'Keefe
Attorney—Young & Quigg

[57] ABSTRACT

A method for isomerizing olefinic hydrocarbons which employs a zinc arsenide catalyst, the arsenide being present in relation to the zinc in a molal ratio between about 0.33 and 3.0.

6 Claims, No Drawings

ZINC ARSENIDE ISOMERIZATION CATALYST AND PROCESS

This invention relates to isomerization of hydrocarbons.

In one of its more specific aspects, this invention relates to hydrocarbon isomerization and to the employment of zinc arsenide catalysts in conjunction therewith.

Isomerization processes are well known as useful for rearranging the molecular structure of hydrocarbons to convert them into more valuable materials. The catalyst and the method of this invention employing that catalyst perform this function.

According to this invention there is provided a method of isomerizing olefinic hydrocarbons which comprises contacting the olefinic hydrocarbon with hydrogen and with a catalyst having the formula $ZnAs_x$ in which $x$ has a value from about 0.33 to about 3.0 under conditions to isomerize the olefins and recovering the isomerized product.

According to this invention there is also provided an olefin isomerization catalyst having the formula $ZnAs_x$ in which $x$ has a value within the range of from about 0.33 to about 3.0.

This invention is applicable to double bond isomerizable olefinic hydrocarbons which can be contained in a feedstock with other hydrocarbons. The olefinic hydrocarbons can contain from four to about 30 carbon atoms per molecule and from one to about four double bonds per molecule. The olefinic hydrocarbons can be either cyclic or acyclic with the olefin saturation being either terminal or internal. The olefinic hydrocarbon can contain cycloalkyl, aryl, and/or alkaryl substituents; however, the total number of carbon atoms in such substituted olefinic molecules will not exceed about 30.

Preferred olefinic hydrocarbons are terminal monoolefins, non-conjugated polyenes, and diolefins having conjugated double bonds wherein the conjugated system is not centrally located in the molecule.

Some examples of olefinic compounds with which the process and catalyst of this invention are operable include butene-1, butene-2, pentene-1, 1,5-cyclooctadiene, eicosene-1, 4-phenylbutene-1, 3-ethylcyclopentene, triacontene-1 and mixtures thereof. The method and catalyst are particularly applicable to the isomerization of cyclic polyenes such as 1,5-cyclooctadiene and its alkyl derivatives and to the isomerization of alkenyl-substituted cycloolefins such as 4-vinylcyclohexene and its alkyl derivatives of the type described.

The catalyst of this invention may be supported or unsupported; if supported, the supported form can have a zinc content of from 0.05 to about 50 weight percent.

In its preferred form, the catalyst of this invention has a formula in which the value of $x$ is within the range of from about 0.5 to about 1.5 and will be supported on a material selected from the group consisting of alumina, silica, silica-alumina, and mixtures thereof, and other substantially nonacidic supports in which the zinc content will be from about 5 to about 20 weight percent.

The method of this invention employs isomerization conditions in which the temperature is within the range of about 300° to 1,000° F., the pressure is within the range of about atmospheric to about 1,000 psig, the olefin charge rate is within the range of from about 0.1 to about 10 WHSV and the amount of hydrogen employed is within the range of from about 0.1 to about 20 moles of hydrogen per mole of olefin. Any concentration of olefin can be present in the hydrocarbon stream so long as the concentration therein is sufficient to allow isomerization of the olefin under the conditions defined.

The catalyst of this invention can be prepared by preparing a solution of an arsenic-bearing compound and a zinc-bearing compound and mixing the two solutions to produce a zinc-arsenate compound which is reduced to zinc arsenide. In its supported form, the catalyst can be prepared by preparing a solution in which the zinc and arsenic are present, slurrying the support therein to deposit the zinc and arsenic compounds on the support and calcining the support to leave the zinc and arsenic on the catalyst in the form of zinc arsenate which is reduced to zinc arsenide.

In its preferred method of preparation, an arsenic compound is dissolved in a strong mineral acid and a zinc salt is dissolved in the resulting solution. The solid carrier is slurried therein and the zinc arsenate compound is precipitated from solution on the carrier which is calcined and reduced to convert the zinc arsenate to zinc arsenide. Residual zinc arsenate can be present.

The best mode of preparing the catalyst of this invention and the method of carrying out the process of this invention are demonstrated in the following examples.

EXAMPLE I

The catalyst of this invention was prepared by adding nitric acid to water containing 6 parts by weight $H_3AsO_4$ and 9 parts by weight $ZnOAc \cdot 2H_2O$ until all solids had dissolved. 50 parts by weight of alumina were added to the solution and the resulting slurry was neutralized with dilute ammonium hydroxide to precipitate zinc arsenate. The slurry was recovered, dried, crushed and calcined at 1,000° F. in air for 2 hours. It was then reduced in a stream of hydrogen at a temperature of about 800° F. for 15 hours.

EXAMPLE II

The catalyst prepared in Example I was employed in the isomerization of 4-vinylcyclohexene contained in cyclohexane under the conditions, and with the results indicated.

|  | Test 1 | 2 |
|---|---|---|
| Conditions of Operation |  |  |
| Temperature, °F. | 563 | 587 |
| Pressure, psig | 500 | 500 |
| WHSH, 4-vinylcyclohexene | 0.6 | 0.4 |
| GHSV, Hydrogen | 1000 | 1000 |
| Conversion, Wt. % | 28.2 | 83.5 |
| Product Analysis, Wt. % |  |  |
| cis and trans-3-ethylidene Cyclohexene | 37.7 | 35.4 |
| cis and trans-4-ethylidene Cyclohexene | 9.9 | 2.1 |
| Ethylcyclohexenes | 6.1 | 15.3 |
| 1-ethyl-1,4-cyclohexadiene | 14.0 | 8.4 |
| Other ethylcyclohexadienes | 28.2 | 26.2 |
| Ethylbenzene | 4.1 | 12.5 |

The above data demonstrate the operability of the method and catalyst of the invention.

It will be evident from the above that various modifications can be made to the process of this invention. However, such are considered to be within the scope of the invention.

What is claimed is:

1. A method of isomerizing an olefinic hydrocarbon which comprises contacting said hydrocarbon with hydrogen and with a catalyst having the formula $ZnAs_x$ in which x has a value within the range of from about 0.33 to about 3.0 under conditions to isomerize said hydrocarbon and recovering the isomerized olefin.

2. The method of claim 1 in which said catalyst comprises zinc in the form of zinc arsenide.

3. The method of claim 1 in which said value of $x$ is within the range of from about 0.5 to about 1.5 and said catalyst is supported.

4. The method of claim 1 in which said catalyst is supported on a material selected from the group consisting of alumina, silica, silica-alumina, and mixtures thereof.

5. The method of claim 1 in which said hydrocarbon is isomerized at a temperature within the range of from about 300° to 1,000° F. at a pressure within the range of from about atmospheric to about 1,000 psig at an olefin charge rate within the range of from about 0.1 to about 10 WHSV and at a hydrogen rate within the range of from about 0.1 to about 20 moles per mole of said olefin.

6. The method of claim 1 in which 4-vinylcyclohexene is isomerized with a supported catalyst at a temperature of about 587° F. at a pressure of 500 psig at a hydrogen rate of 1,000 hourly space velocity.

* * * * *